July 10, 1956

H. BRUDNEY 2,753,560

APPARATUS FOR MOUNTING DOLLS' EYES

Filed March 13, 1953

INVENTOR.
HARRY BRUDNEY,
BY Albert M Zalkind
ATTORNEY.

July 10, 1956 H. BRUDNEY 2,753,560
APPARATUS FOR MOUNTING DOLLS' EYES
Filed March 13, 1953 3 Sheets-Sheet 2

INVENTOR.
HARRY BRUDNEY,
BY Albert M. Zalkind
ATTORNEY.

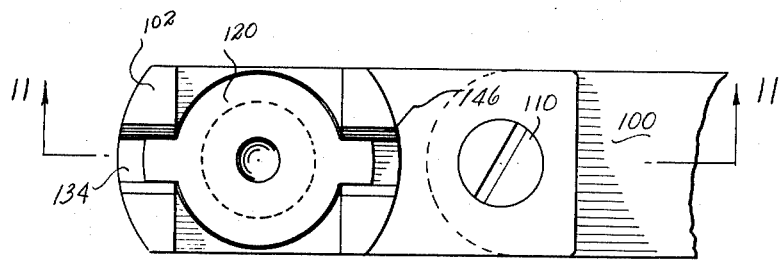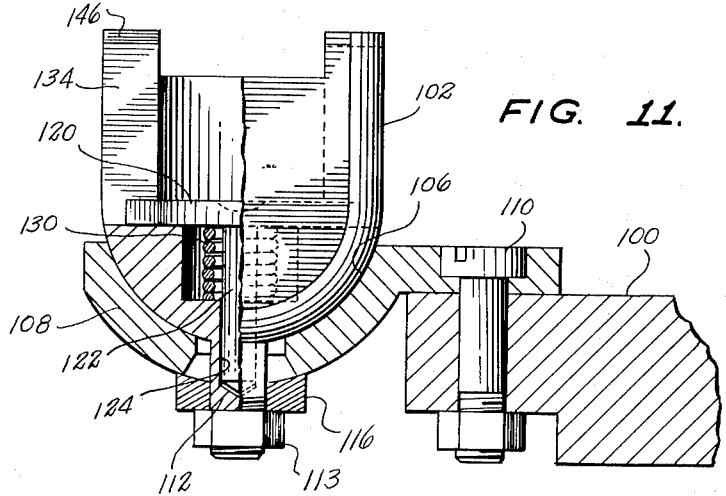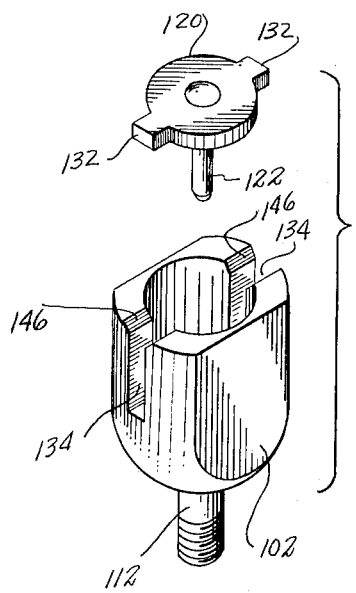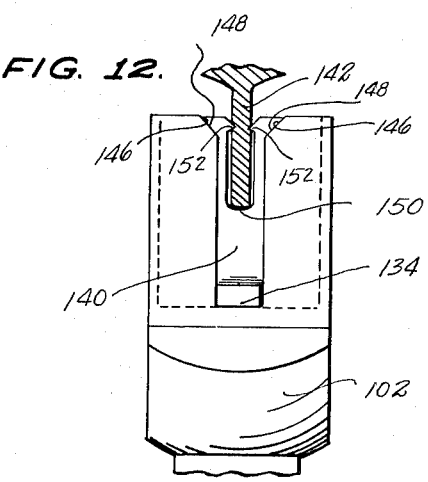

United States Patent Office 2,753,560
Patented July 10, 1956

2,753,560

APPARATUS FOR MOUNTING DOLLS' EYES

Harry Brudney, New York, N. Y., assignor to Dollac Corporation, New York County, N. Y., a corporation of New York Application March 13, 1953, Serial No. 342,161

13 Claims. (Cl. 1—210)

This invention relates to tools and methods for mounting dolls' eyes in dolls' heads and more particularly to a tool for use in combination with a novel mounting bracket.

One of the difficulties encountered in mounting eyes is the need for considerable hand manipulation of the eye mounting elements so as to make the eye properly fit the sockets of the doll's head. Since the different dolls' heads as molded present various facial characteristics which cause the eye sockets to be disposed at various angles, it is customary to make special tools for mounting the eyes for each different type of head. Further, a great deal of hand fitting is required which is expensive and time consuming.

It is an object of the present invention to provide means for eliminating the separate tools heretofore required as well as the hand fitting. It is an additional object of my invention to provide an eye mounting tool or fixture which can be easily adjusted so as to be universally usable with various kinds of dolls' heads. It is a further object of my invention to provide a tool, which in conjunction with a novel type of mounting bracket for a doll's eye, renders the mounting of dolls' eyes a simple and cheap operation, in contrast to prior slow and skilled work heretofore necessary.

In brief, my invention comprises a tool having universal adjustability so that it can be set in any position relative the eye sockets of a particular doll's head. The tool incorporates means for holding a novel mounting bracket, to which is affixed a doll's eye, and positioning the bracket within a doll's head. Thereafter pressure is applied to the face of the doll to force the head into engagement with the bracket so that certain interior portions of the head are gripped by the bracket which has prongs that are forced together by virtue of the coaction between the exterior pressure and the bracket holding means.

A detailed description of the invention will now be given in conjunction with the appended drawing in which:

Fig. 10 is a plan view of a modified portion of the tool; and

Fig. 11 is a section through 11—11 of Fig. 10.

Fig. 12 is a fragmentary view showing the mounting bracket clamped in place on a protuberance within a doll's head, and Fig. 13 is an exploded perspective of certain operative elements of the tool.

Figure 1:
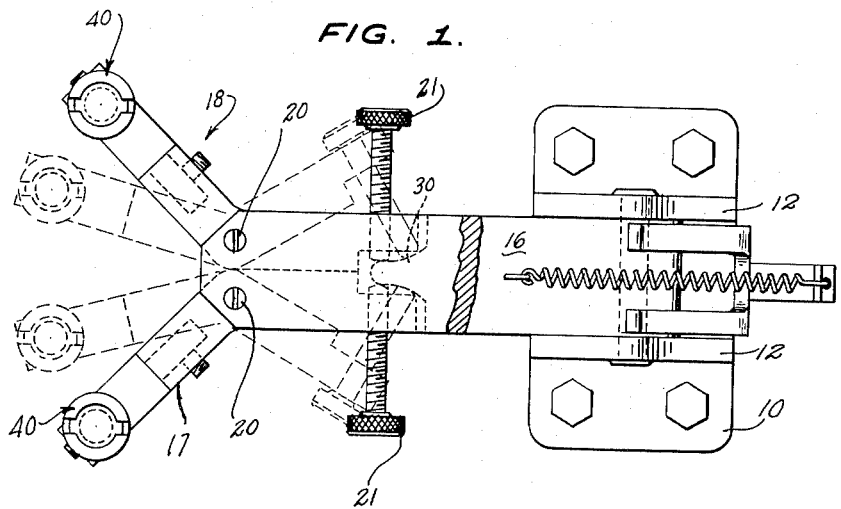
Fig. 1 is a plan view of the tool.

With reference to Figs. 1 through 9, my invention comprises a base 10 which supports a pair of parallel standards 12. Secured between the standards is a fixed arm 16 which carries at its outer end a pair of angularly bent movable arms 17 and 18. Each of the movable arms is pivoted within a bifurcated portion or slot 19 in fixed arm 16 by means of respective bolts 20. Thus the arms are movable in a horizontal plane within the range shown in dot-dash lines and can be adjusted in position for any distance between eyes by means of respective screws 21 which abut a centrally disposed wall 30 at the inner extremity of slot 19. Accordingly, by tightening the screws 20 a clamping action of the sides of the slot can be exerted on the arms so as to hold them in predetermined angular position.

Figure 5:
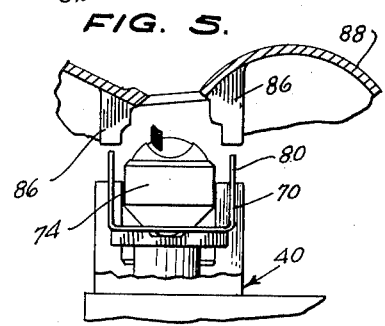
Fig. 5 is a fragmentary elevation showing the positioning of the eye relative a doll's head prior to securement therebetween.
Figure 9:
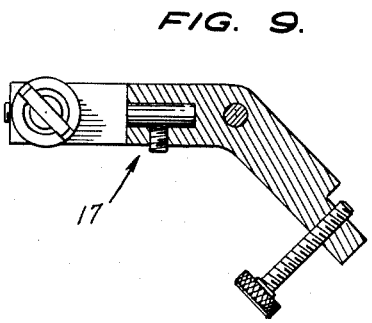
Fig. 9 is a plan of one of the elements of the tool.

The arms carry rotatable tip elements or collars 40 having respective openings 42, set screws 44 being utilized to hold the collars 40 in position. The collars 40 may be rotated around vertical axes and held at any desired rotated position by means of respective set screws 44. Each collar 50 has a plunger 49 slidable therein and having a platform 50 biased upwardly by a means of a spring 52 secured by a bolt 54. The upper portion of each socket element is provided with a slot 58 across the central portion and is provided with a counter bore 60. An eye shell and bracket mount such as is shown and described in my co-pending application S. N. 342,162, filed March 13, 1953, can be manually placed in the counterbore and slot as shown in Figs. 5 and 6.

By virtue of slot 58 walls such as 58a and b are formed which opposed, respectively, walls 58c and d. Thus an opening is provided into which an eye mounting bracket 70 may be manually slid so as to initially dispose the eye unit 74 in the holder socket 40 wherein it rests on the spring biased platform 50.

Figure 6:
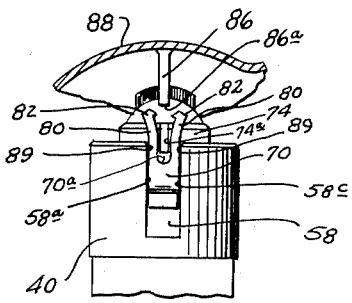
Fig. 6 is a view taken at right angles to the view of Fig. 5.

As seen in Fig. 6 the bracket element 70 is provided with extending prong elements 80 having inwardly facing points 82. The prong element at each side of the bracket are suitably spaced so as to accommodate a respective protuberance, or projection 86, which is formed as part of the doll's head 88. Further, the prong elements are initially bent outwardly so that they must be bent inwardly as the bracket is forced downwardly, against edges 89 at the top of the slot, thus compelling the points 82 to grip their respective projections 86.

Accordingly, if the doll's head be forced downwardly until the inner end 86a of respective projection 86 engages the respective inner end 70a of the slot formed by the prong element spacing, the entire bracket and doll's eye will be forced downwardly into the lower portion of slot 58 and the prong elements thus forced inwardly to be embedded in respective projections 86. This action takes place against the bias of spring 52 so that when the downward pressure on the doll's head is released the platform 50 will rise to eject the assembly.

Figure 7:
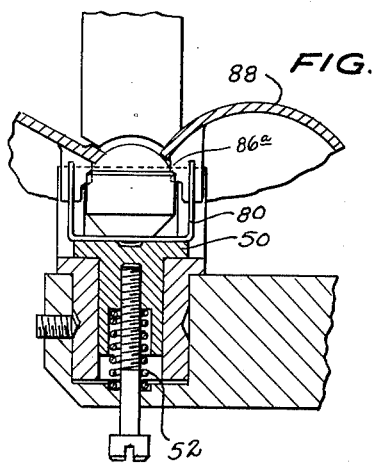
Fig. 7 shows the relationship of the bracket and the head after the bracket has been secured in place.
Figure 8:
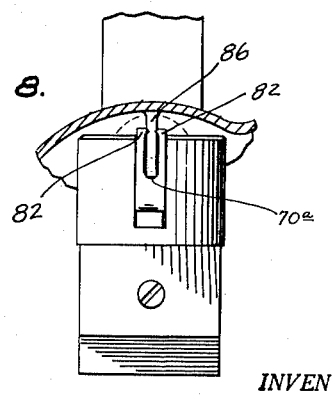
Fig. 8 is a view taken at right angles to the viewing direction of Fig. 7.

With reference to Figs. 7 and 8, the final phase of the gripping action is shown with the plunger in maximum downward position and the points 82 forced into the material of projection 86.

Thus both eyes are simultaneously fixed within the doll's head and by virtue of the predetermined positioning provided by the universally adjustable construction, the eyes will be properly received and positioned within respective sockets.

Figure 2:
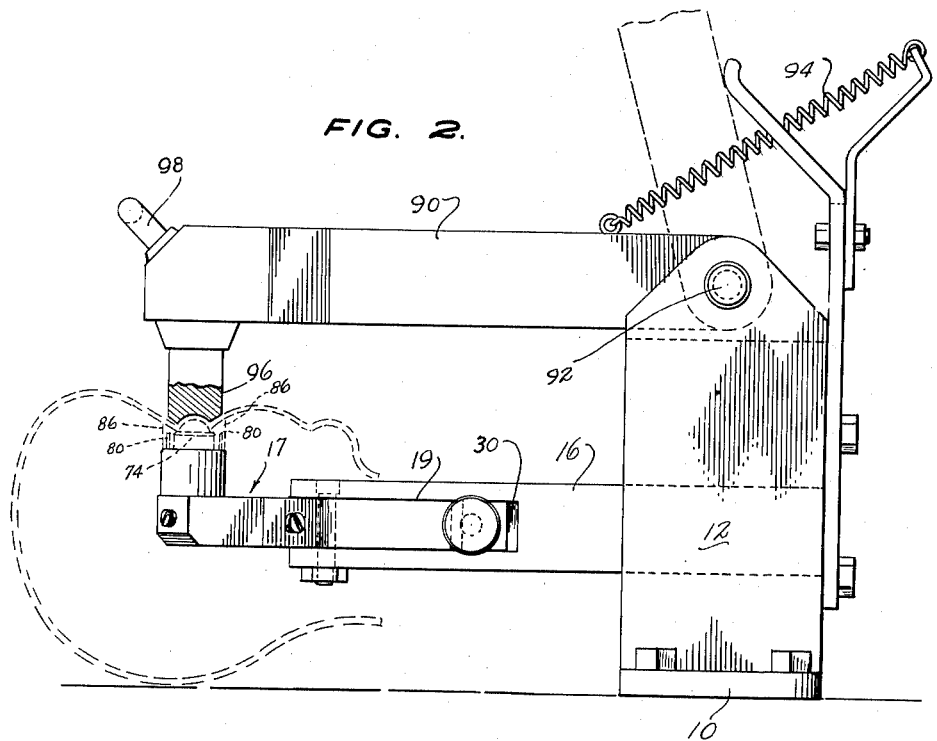
Fig. 2 is an elevation thereof.
Figure 3:
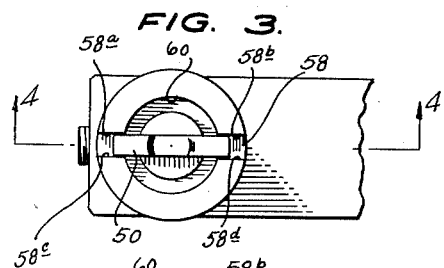
Fig. 3 is a detail of one of the bracket holding members shown in plan.
Figure 4:
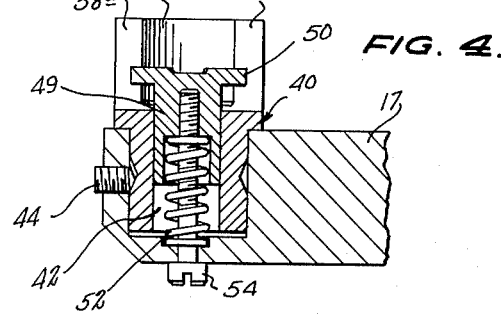
Fig. 4 is a section through 4—4 of Fig. 3.

In order to bring suitable pressure on the doll's head so as to effect the clinching of the bracket prong elements, I provide an arm 90 pivotally carried as at 92 by the standards 12 and spring biased by spring 94 to upward position as indicated by the dot-dash lines in Fig. 2. At the outer end of arm 90 is carried a suitable pressure member 96 having an outer end shaped to conform with the general configuration of the doll's face around the eye sockets. The pressure member 96 may be made of any suitable material which will not mar the doll face, for example, rubber or plastic. A handle 98 is provided at the end of arm 90 for convenience in manipulating the arm and also to assist in bringing manual downward pressure to bear on the doll face. It is contemplated that arm 90, or pressure members 96, would be changed to match the configuration of the eye socket regions of various types of dolls, if necessary.

It will now be appreciated that the operation of my tool is exceedingly simple, it being only necessary to place an eye unit complete with brackets in position in each of the sockets 40, as indicated in Fig. 6 and then to place the doll's head over the eye units and position it so that the eyes are in registration with the eye sockets of the head. Arms 17 and 18 either protrude through the open neck of the doll head or only the face portion of the head may be utilized at this time, the back portion being cemented to the face portion after affixation of the eyes. Subsequently arm 90 is forced downwardly to effect entry of projections 86 within the spaces between respective prong elements 80 and then the action occurs as hereinabove described. Upon lifting arm 90 the head assembly is pushed upwardly for removal by virtue of the action of the springs 52.

Attention is now directed to Figs. 10 and 11 disclosing a modification for the extremities of the arms. In this instance each arm 100, which corresponds to arms 17 and 18 of the form previously described, carries a socket element 102 substantially like the socket element 40 except that the bottom portion is rounded at 106 and is carried in a cup 108 which is adjustably pivoted by a bolt 110 to arm 100. Cup 102 is formed with a bolt end 112 secured by a nut 113 acting on a concave washer 116 against the bottom surface of cup 108. Thus, it will be appreciated that the socket 102 can be adjusted to any angular position and secured in such position by tightening nut 113. Carried with the socket is a seating member 120 having a depending pin 122 slidable in a bore 124 provided in the bottom of socket 102 and extending into the bolt end. A spring 130 is utilized to bias the seating member upwardly. The seating member is provided with lugs 132 which reciprocate in slots 134 of the socket to guide the reciprocal motion of the seating member which is shown in maximum downward position in Fig. 11. The slots 134 also serve to accommodate the mounting bracket 140 as shown in Fig. 12 when it is forced downwardly by virtue of a protuberance 142 shown in cross section. The arrangement is somewhat different than that described in the preceding modification in that sloping shoulders 146 are provided at the upper ends of the slots which engage outwardly bent portions 148 of the mounting bracket. Thus, as the protuberance 142 is forced downwardly, abutting the edge 150 in each arm of the mounting bracket, the bracket is forced downwardly so that the arms slide within respective slots 134 until the sloping shoulders 146 are in engagement with the sloping arm edges 148, respectively, thus terminating the downward motion. At this time, the prong points 152 are imbedded in protuberance 142, the action being the same as was heretofore described in connection with Figs. 6 and 8.

During the pressing operation, the arrangement of seat 120 and spring 130 acts as a cushion and need not necessarily be relied on for ejection of the mounting doll's head, since the tapered arrangement of the shoulders 146 and 148 will make it relatively easy to lift the head off the tool and withdraw it.

It will thus be apparent by the use of the principle of a universal ball joint any desired angularity of each eye may be provided in any vertical plane, while suitable horizontal angularity can be secured by the means of the bolt 110.

The advantages of my doll mounting means are apparent. At present when a doll manufacturer orders eyes from a dolls' eyes manufacturer, the latter assembles the eyes in pairs disposed and adjusted to fit the particular doll to be manufactured. This is expensive in time, delay and labor. With the present invention a doll manufacturer can keep a stock of identical eyes for mounting individually in heads as occasion warrants. The invention is applicable to either hard or flexible doll heads.

Having thus described my invention I am aware that numerous changes may be made without departing from the spirit thereof and therefore do not seek to be limited to the specific disclosure set forth herein except as set forth in the appended claims.

I claim:

1. Apparatus for inserting dolls' eyes in dolls' heads comprising an arm having a holder insertable in a doll's head, said holder having means for holding a doll's eye, and means for rotatively adjusting said holder with respect to said arm so as to hold said eye in a particular position with respect to an eye socket in a doll's head into which said arm is inserted, wherein the axis of rotation is substantially the axis of said eye.

2. Apparatus for inserting dolls' eyes in dolls' heads comprising an arm having a holder insertable in a doll's head, said holder having means for holding a doll's eye, and means for universally adjusting said holder with respect to said arm so as to hold said eye in a particular position with respect to an eye socket in a doll's head into which said arm is inserted.

3. A holder tool for inserting dolls' eyes in dolls' heads, comprising a universally adjustable socket for supporting an eye and a pair of spaced surfaces adjacent said socket for slidably engaging bendable prongs of a mounting bracket, including means for resiliently cushioning said eye in said socket.

4. Apparatus for inserting dolls' eyes in dolls' heads comprising a holder tool for holding a bracket which carries a doll's eye, said tool being insertable in a doll's head and comprising a socket element for accommodating said doll's eye during operation of the tool, said socket having walls comprising longitudinal recesses for accommodating portions of said bracket when said doll's eye is disposed in the socket element.

5. Apparatus as set forth in claim 4, including a cushion plate within said socket element and resilient means for biasing said plate against a doll's eye within said socket element.

6. Apparatus as set forth in claim 4, said recesses having bevelled shoulders at their respective outer ends.

7. Apparatus as set forth in claim 4, said socket element being mounted for rotative adjustment substantially around the axis of a doll's eye within said socket element.

8. An apparatus as set forth in claim 4, said socket element being mounted for universal motion.

9. An apparatus as set forth in claim 4, including an arm on which said socket element is carried, and means for rotatively adjusting said socket element with respect to said arm.

10. An apparatus for mounting dolls' eyes in dolls' heads comprising a fixture having a pair of relatively pivotal arms and means for securing said arms in fixed position with respect to each other, including means at corresponding extremities of said arms for accommodating respective dolls' eyes whereby said arms can be adjusted to space said eyes for registration with the eye openings of various types of dolls' heads.

11. An apparatus as set forth in claim 10, wherein said means is rotatively adjustable relative respective arms.

12. An apparatus as set forth in claim 10, wherein said means is universally adjustable relative respective arms.

13. An apparatus for inserting dolls' eyes in dolls' heads comprising a base, a pair of arms pivotally carried by said base, means for pivoting said arms and holding them in selected position relative each other whereby the outer extremities of said arms may be disposed to register with the eye openings of dolls' heads of various types, socket elements carried at said outer extremities for accommodating respective dolls' eyes, said socket elements being adjustable relative respective arms so as to selectively vary the angularity of the eyes carried in said socket elements with respect to the axes of respective eye openings into which said eyes are to be inserted, and means carried by said base for effecting pressure on the exterior surface of a doll's head so as to propel said head toward said arms, said socket elements comprising means for deforming respective eye carrying brackets when said head is propelled toward said arms so as to cause said brackets to clinch on the material of said head interiorly thereof to hold respective eyes in position.

References Cited in the file of this patent
UNITED STATES PATENTS

| | | |
|---|---|---|
| 1,463,144 | Carter | July 24, 1923 |
| 1,639,033 | Grubmann | Aug. 16, 1927 |
| 1,744,129 | Marcus | Jan. 21, 1930 |